(12) United States Patent
McCarty (10) Patent No.: US 10,458,555 B2
(45) Date of Patent: Oct. 29, 2019

(54) CONTROL VALVE WITH HIGH PERFORMANCE VALVE CAGE

(71) Applicant: FISHER CONTROLS INTERNATIONAL LLC, Marshalltown, IA (US)

(72) Inventor: Michael W. McCarty, Marshalltown, IA (US)

(73) Assignee: FISHER CONTROLS INTERNATIONAL LLC, Marshalltown, IA (US)

( * ) Notice: Subject to any disclaimer, the term of this patent is extended or adjusted under 35 U.S.C. 154(b) by 85 days.

(21) Appl. No.: 15/491,341

(22) Filed: Apr. 19, 2017

(65) Prior Publication Data

US 2018/0306334 A1 Oct. 25, 2018

(51) Int. Cl.
*F16K 5/10* (2006.01)
*F16K 47/08* (2006.01)
*F16K 47/12* (2006.01)
*F16K 3/24* (2006.01)

(52) U.S. Cl.
CPC .............. *F16K 5/10* (2013.01); *F16K 3/246* (2013.01); *F16K 47/08* (2013.01)

(58) Field of Classification Search
CPC .......... F16K 47/00; F16K 47/02; F16K 47/08; F16K 47/12; F16K 5/10
USPC ........................................ 251/118, 126, 127
See application file for complete search history.

(56) References Cited

U.S. PATENT DOCUMENTS 3,688,800 A * 9/1972 Hayner .................... F15D 1/02
  137/625.3
3,978,891 A * 9/1976 Vick ......................... F16K 3/34
  138/42
4,079,754 A * 3/1978 Porter ...................... F15D 1/02
  138/42
RE32,197 E * 7/1986 Self .......................... F15D 1/14
  137/549
6,637,452 B1 * 10/2003 Alman ................... F16K 3/243
  137/244
6,701,957 B2    3/2004 McCarty et al.
(Continued)

FOREIGN PATENT DOCUMENTS

CN        105626957 A    6/2016
EP          3009723 A1   4/2016
WO      WO-0184029 A1   11/2001

OTHER PUBLICATIONS

International Search Report for PCTUS2018/027424 dated Jul. 9, 2018.
Written Opinion for PCT/US2018/027424 dated Jul. 9, 2018.

*Primary Examiner* — Seth W. Mackay-Smith
(74) *Attorney, Agent, or Firm* — Marshall, Gerstein & Borun LLP (57) ABSTRACT

A control valve includes a body having an inlet and an outlet and a valve seat positioned in a passageway between the inlet and the outlet. A valve plug is positioned within the body and is movable between an opened position and a closed position to modulate a fluid flow at the outlet. A cage is disposed within the body adjacent the valve seat and proximate the valve plug and has a circumferential wall having an outer surface and an inner surface aligned along a longitudinal axis of the cage. The outer surface of the cage defines an outer flow length and the inner surface defines an inner flow length that is less than the outer flow length.

17 Claims, 9 Drawing Sheets

(56) References Cited

U.S. PATENT DOCUMENTS

| | | | |
|---|---|---|---|
| 6,782,920 B2* | 8/2004 | Steinke | F16K 47/08 |
| | | | 137/625.3 |
| 6,935,370 B2* | 8/2005 | McCarty | F16K 47/04 |
| | | | 137/625.3 |
| 7,448,409 B2* | 11/2008 | Micheel | F16K 3/246 |
| | | | 137/625.37 |
| 9,115,824 B2* | 8/2015 | Cazcarra Pallaruelo | |
| | | | F16K 3/24 |
| 9,624,748 B2* | 4/2017 | Gnanavelu | E21B 33/076 |
| 9,650,862 B2* | 5/2017 | Husveg | F16K 47/12 |
| 9,943,784 B2* | 4/2018 | Kirk | B01D 24/4626 |
| 10,036,486 B2* | 7/2018 | Glaun | F16K 47/04 |
| 2003/0034074 A1 | 2/2003 | McCarty et al. | |
| 2006/0049375 A1* | 3/2006 | Gossett | F16J 15/0806 |
| | | | 251/357 |
| 2010/0300542 A1 | 12/2010 | Haines et al. | |
| 2015/0129786 A1 | 5/2015 | Cazcarra Pallaruelo | |
| 2016/0341335 A1* | 11/2016 | Adams | F16K 47/08 |

* cited by examiner

CONTROL VALVE WITH HIGH PERFORMANCE VALVE CAGE

FIELD OF THE DISCLOSURE

This disclosure relates generally to control valves and, more particularly, to high performance cages for control valves.

BACKGROUND

In typical control valves, a valve cage may provide guidance for a valve plug as the valve plug moves from a closed position in which the valve plug sealingly engages a valve seat to an open position in which the valve plug is disposed away from the valve seat. When the valve is in the open position, fluid flows from a valve inlet, passes through a passage between the valve seat and the valve plug, passes through the valve cage, and exits through a valve outlet. In addition to guiding the valve plug, a valve cage can also be used for additional functions, such as noise reduction.

Typical control valve cages usually include an annular cylindrical body having a plurality of co-planar, radial flow passages as a means to either control flow or add stability and/or robustness to the throttling plug. However, in applications that use a valve cage to condition and/or characterize the fluid flow, current technologies typically rely on drilling holes through the annular cylinder, using laminated through cut discs that are stacked and welded, brazed, or bolted together, or using laminated cast or etched discs that are stacked and welded, brazed or bolted together.

However, typical valve cages, especially high performance elements like anti-cavitation or noise attenuation designs, have many design restrictions to ensure performance. For example, proper outlet hole spacing is essential in many cases to ensure appropriate noise attenuation or energy dispersion. These designs usually have flow passages (inlet to outlet) that are fundamentally in the same plane. Although the flow passages can be any shape, length, diameter, with or without features like restrictions or expansions, these passages are largely co-planer and progress radially from the inner diameter of the valve cage to the outer diameter or form the outer diameter of the valve cage to the inner diameter, depending on the flow direction of the control valve. Therefore, to ensure the proper outlet spacing for the required high performance design, the inlets also must have a similar spacing, which can require a large travel distance of the valve plug between the fully closed and fully opened positions.

BRIEF SUMMARY OF THE DISCLOSURE

In accordance with one exemplary aspect of the present invention, a control valve comprises a body having an inlet and an outlet and a valve seat positioned in a passageway between the inlet and the outlet. A valve plug is positioned within the body and is movable between an opened position and a closed position to modulate a fluid flow at the outlet. A cage is disposed within the body adjacent the valve seat and proximate the valve plug and has a circumferential wall having an outer surface and an inner surface aligned along a longitudinal axis of the cage. The outer surface of the cage defines an outer flow length and the inner surface defines an inner flow length that is less than the outer flow length.

In further accordance with any one or more of the foregoing exemplary aspects of the present invention, the control valve may further include, in any combination, any one or more of the following preferred forms.

In one preferred form, the cage further comprises a first end and a second end opposite the first end. A plurality of outlets are formed in the outer surface, where a longitudinal distance between a first outlet, closest to the first end of the cage, and a second outlet, closest to the second end of the cage, defines the outer flow length. A plurality of inlets are formed in the inner surface, where a longitudinal distance between a first inlet, closest to the first end of the cage, and a second inlet, closest to the second end of the cage, defines the inner flow length.

In another preferred form, the first outlet is in fluid communication with the first inlet through a first flow passage and the second outlet is in fluid communication with the second inlet through a second flow passage.

In another preferred form, the first flow passage and the second flow passage have a generally spiral shape about the longitudinal axis.

In another preferred form, the second flow passage has a portion that extends at an acute angle from a radial plane extending generally perpendicular to the longitudinal axis and through the second inlet.

In another preferred form, the cage is an integral, solid cylinder.

In another preferred form, the cage comprises a plurality of stacked disks.

In another preferred form, the control valve further comprises an actuator sized to stroke the valve plug along the longitudinal axis throughout the inner flow length of the inner surface to modulate a fluid flow along the outer flow length of the outer surface.

In another preferred form, each of the plurality of inlets defines a centerline and each of the plurality of outlets defines a centerline. A plurality of flow passages are formed through the wall and provide fluid communication between the inlets and the outlets. The inlets are longitudinally spaced such that the centerlines of the inlets have a first regular spacing and the outlets are longitudinally spaced such that the centerlines of the outlets have a second regular spacing, different than the first regular spacing.

In another preferred form, the first regular spacing is greater than the second regular spacing.

In another preferred form, each flow passage comprises an inlet section that extends generally radially, an outlet section that extends generally radially, and an intermediate section extending between the inlet section and the outlet section and having a generally spiral shape.

In another preferred form, a common inlet section provides fluid entry for multiple flow passages. The intermediate sections of the multiple flow passages spiral in generally opposite directions and each flow passage crosses at least one other flow passage at an intersection and each intermediate section includes a recovery zone downstream of the intersection.

In accordance with another exemplary aspect of the present invention, a control valve cage comprises a circumferential wall having an outer surface and an inner surface aligned along a longitudinal axis of the control valve cage. A plurality of inlets, each defining a centerline, are formed in the inner surface and a plurality of outlets, each defining a centerline, are formed in the outer surface. A plurality of flow passages are formed through the wall and provide fluid communication between the inlets and the outlets. Each flow passage comprises an inlet section, an outlet section, and an intermediate section extending between the inlet section and the outlet section and having a generally spiral shape about the longitudinal axis. At least a portion of the intermediate sections extend at an acute angle from radial planes extending generally perpendicular to the longitudinal axis and through a corresponding inlet section.

In further accordance with any one or more of the foregoing exemplary aspects of the present invention, the control valve cage may further include, in any combination, any one or more of the following preferred forms.

In one preferred form, the cage is an integral, solid cylinder.

In another preferred form, the cage comprises a plurality of stacked disks.

In another preferred form, a common inlet section provides fluid entry for multiple flow passages. The intermediate sections of the multiple flow passages spiral in generally opposite directions and each flow passage crosses at least one other flow passage at an intersection and each intermediate section includes a recovery zone downstream of the intersection.

In another preferred form, the outer surface defines an outer flow length and the inner surface defines an inner flow length that is less than the outer flow length.

In another preferred form, the control valve cage further comprises a first end and a second end opposite the first end. A longitudinal distance between a first outlet, closest to the first end of the cage, and a second outlet, closest to the second end of the cage, defines the outer flow length and a longitudinal distance between a first inlet, closest to the first end of the cage, and a second inlet, closest to the second end of the cage, defines the inner flow length.

In another preferred form, a control valve includes the control valve cage and further comprises a body having an inlet and an outlet, a valve seat positioned in a passageway between the inlet and the outlet, and a valve plug positioned within the body and movable between an opened position and a closed position to modulate a fluid flow at the outlet. The control valve cage is disposed within the body adjacent the valve seat and proximate the valve plug.

In another preferred form, the control valve further comprises an actuator sized to stroke the valve plug along the longitudinal axis throughout the inner flow length of the inner surface to modulate a fluid flow along the outer flow length of the outer surface.

DETAILED DESCRIPTION

The control valve and control valve cage described herein provide a high performance valve cage that allows the use of an actuator with a shorter travel. The cage has a plurality of flow passages that deviate substantially from being coplanar, which provides more compact inlet spacing while still allowing the required outlet spacing, which allows the use of shorter travel actuators, which are less costly, without sacrificing the performance of the cage and its intended design function and features, such as flow capacity, flow characteristics, noise attenuation, cavitation mitigation, etc. The cage utilizes the z-dimension in the flow passage design, angling the flow passages from the inlet to the outlet, allowing the flow passages to flow from an optimal compact low travel inlet side to a wide spaced optimal performance outlet side.

When used in standard, noise or cavitation applications, the cage enables greater performance with the ability to space the outlets further than traditional designs without sacrificing capacity. In addition, when used in place of a cage in a similar travel control valve, the cage can provide additional capacity by utilizing more of the cage diameter that is normally "dead space," which can allow a smaller valve size or improved feature performance.

When used with a control valve having a flow up orientation and a plug/throttling element in the interior of the cage, the cage can have the compact inlets on the interior of the cage and the wide spaced outlets on the exterior of the cage. Conversely, when used with a control valve oriented in the reverse direction and having a flow down orientation and a throttling element on the outside of the cage, the cage can have the compact inlets on the exterior of the cage and wide spaced outlets on the interior of the cage.

Figure 1:
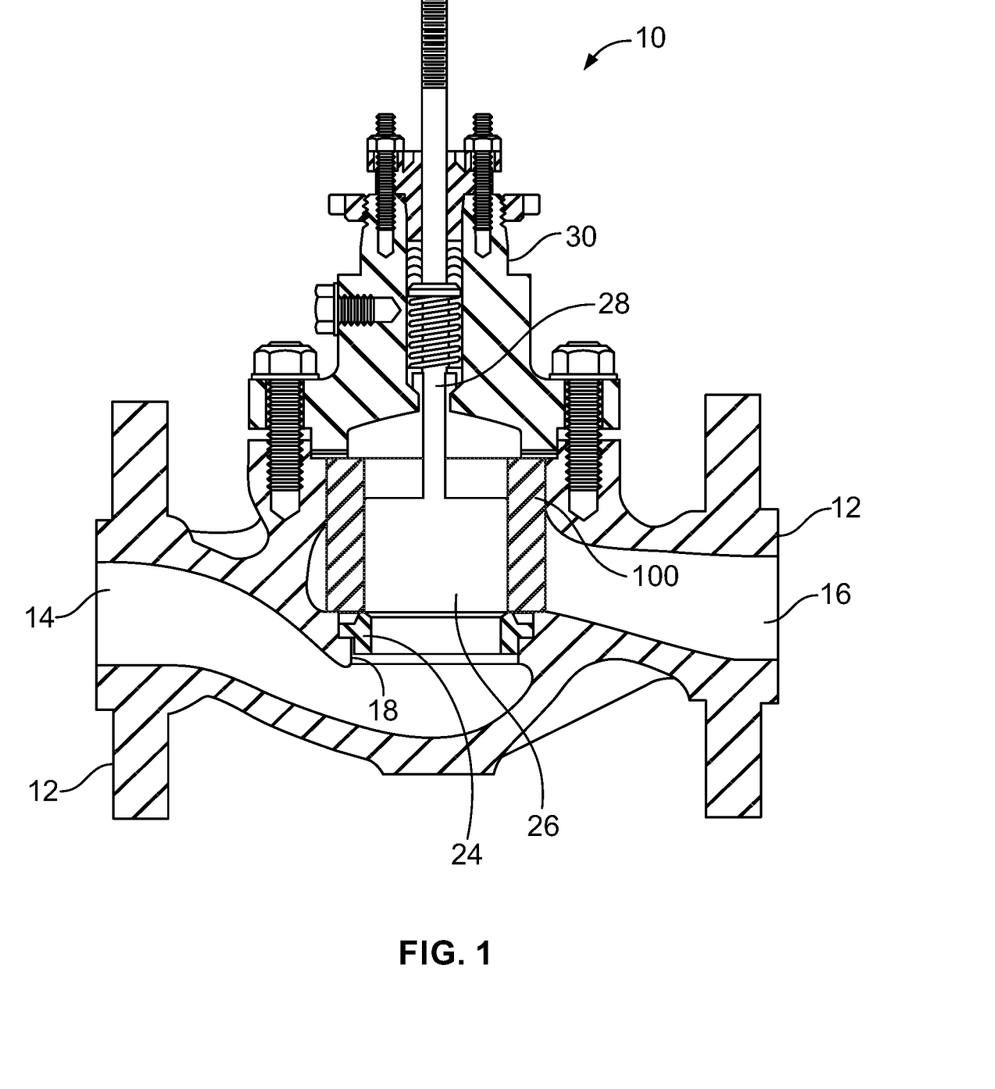
FIG. 1 is a cross-sectional view of an example control valve.

Referring to FIG. 1, control valve 10, having a flow up orientation, generally includes a valve body 12 having an inlet 14, an outlet 16, and a passageway 18 disposed between inlet 14 and outlet 16. A valve seat 24 is disposed in passageway 18 between inlet 14 and outlet 16 and a valve cage 100 is disposed within valve body 12 adjacent valve seat 24. A fluid control member or throttling member, such as valve plug 26, is positioned within valve body 12 and is disposed within cage 100. Valve plug 26 interacts with valve seat 24 to modulate the fluid flow at outlet 16, such that valve plug 26 sealingly engages valve seat 24 in a closed position and is spaced away from valve seat 24 in an opened position. A stem 28 is connected to valve plug 26 at one end and to an actuator 30 at another end. Actuator 30 controls movement of valve plug 26 within cage 100, which is positioned adjacent valve seat 24 and proximate valve plug 26 to provide guidance for valve plug 26.

Referring to FIGS. 2-9, one example of cage 100 is an integral, solid cylinder that can be manufactured using Additive Manufacturing Technology, such as direct metal laser sintering, full melt powder bed fusion, etc., to improve the cost effectiveness of traditional drilled hole cage elements. Using an Additive Manufacturing Technology process, the 3-dimensional design of cage 100 is divided into multiple layers, for example layers approximately 20-50 microns thick. A powder bed, such as a powder based metal, is then laid down representing the first layer of the design and a laser or electron beam sinters together the design of the first layer. A second powder bed, representing the second layer of the design, is then laid down over the first sintered layer and the second layer is sintered together. This continues layer after layer to form the completed cage 100. Using an Additive Manufacturing Technology process to manufacture cages for control valves allows the freedom to produce passages having various shapes and geometries, and other feature described below, that may not be possible using current standard casting or drilling techniques. However, cage 100 can comprise a plurality of traditional laminated through cut, cast, or etched disc stacks, at substantially higher cost and complexity.

Figure 2:
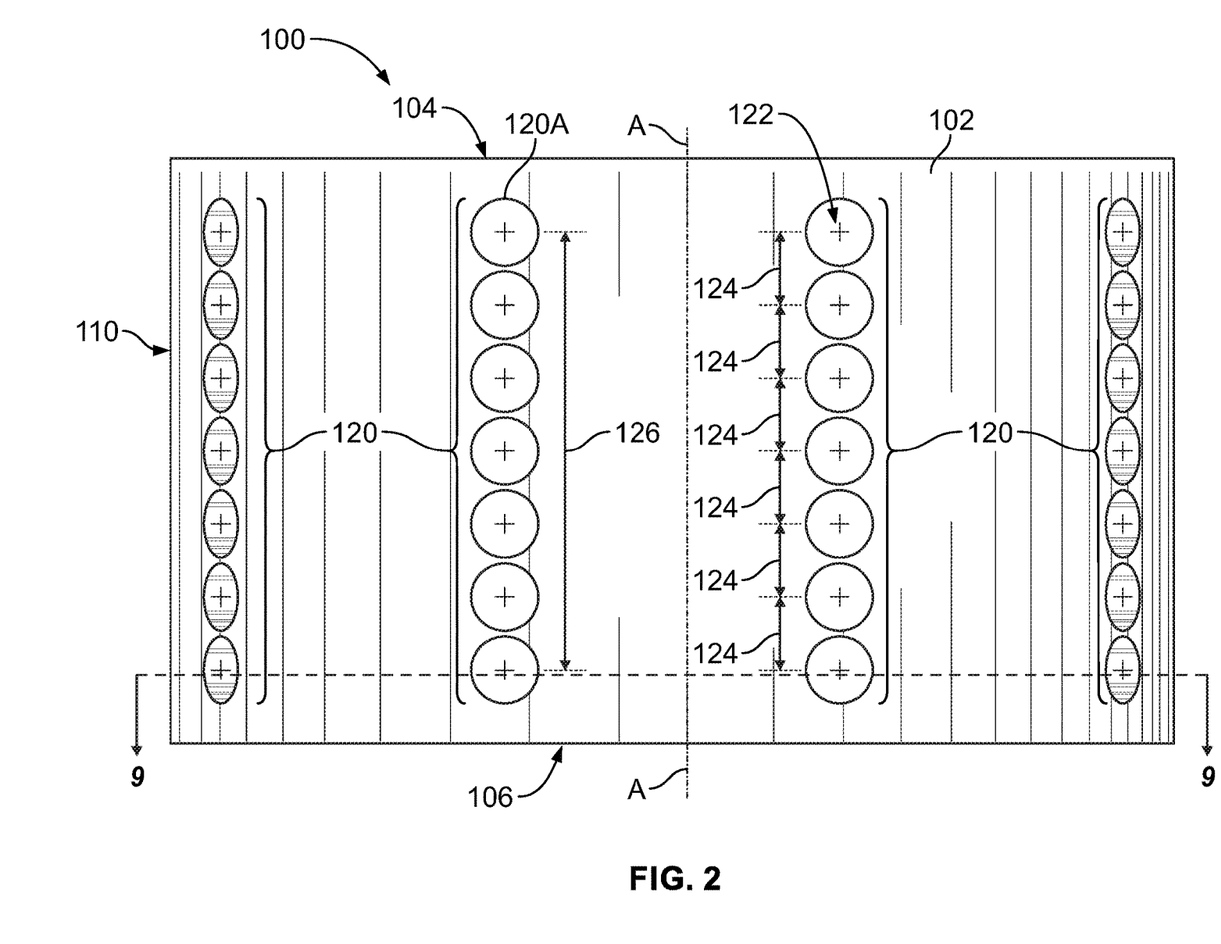
FIG. 2 is a side view of an example control valve cage of the control valve of FIG. 1.
Figure 3:
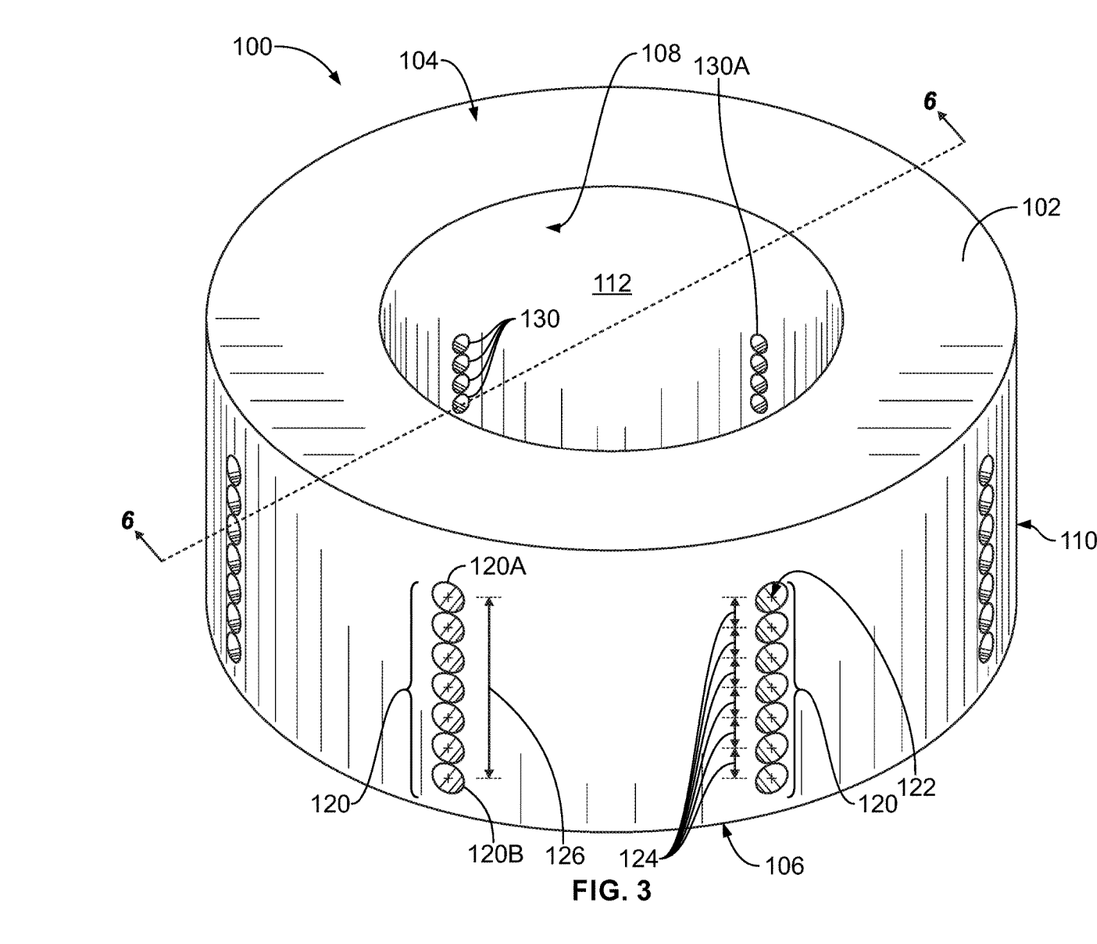
FIG. 3 is a perspective view of the control valve cage of FIG. 2.
Figure 4:
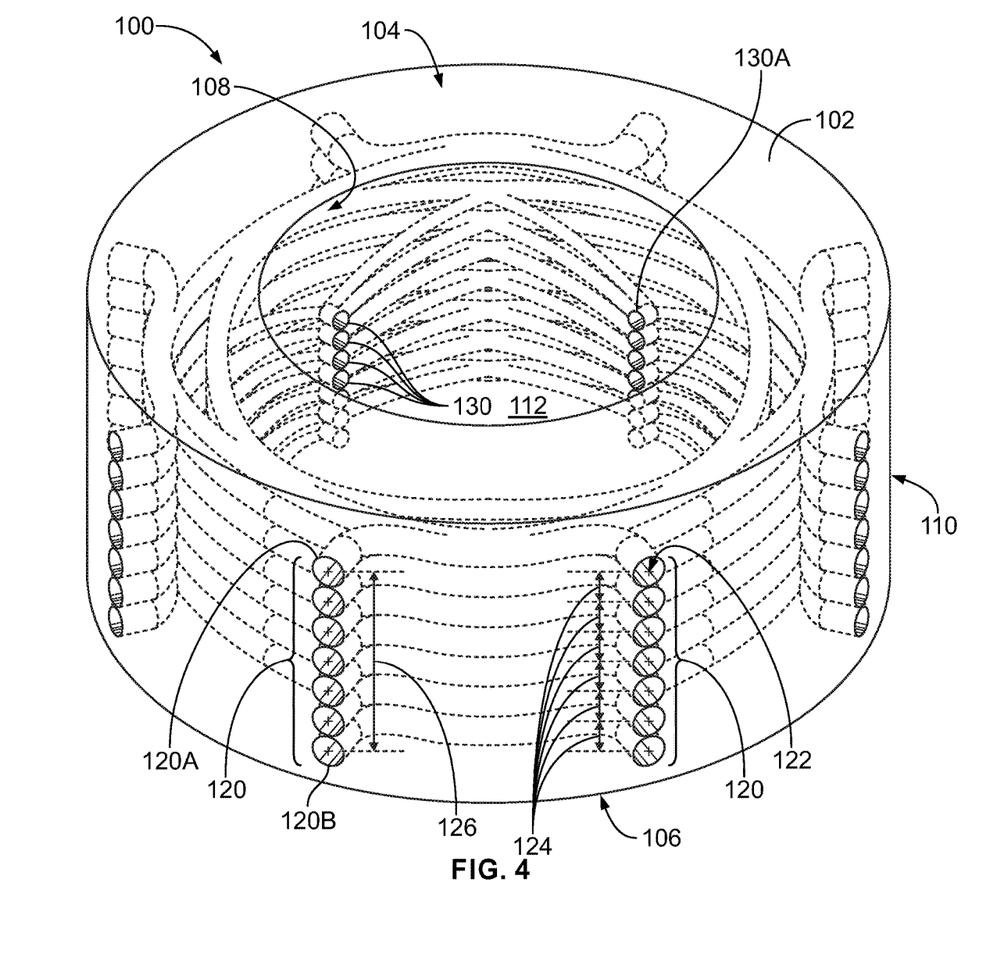
FIG. 4 is the perspective view of the control valve cage of FIG. 3 with flow passages shown in phantom.
Figure 5:
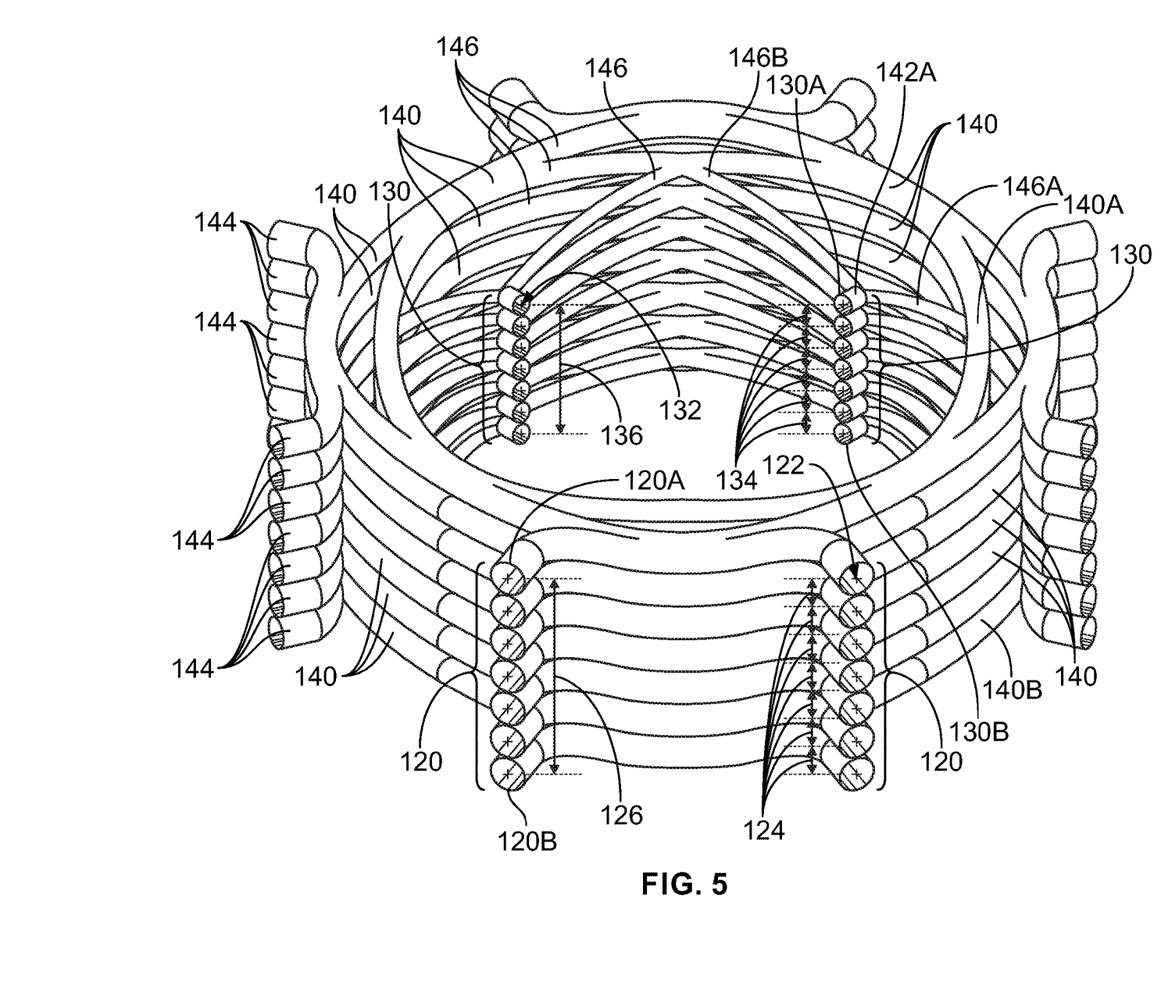
FIG. 5 is an illustration of the flow passages of the control valve cage of FIG. 3.

As shown in FIGS. 2 and 3, cage 100 generally includes a circumferential wall 102 forming a hollow central bore 112, within which valve plug 26 will slide to control fluid flow through cage 100. Wall 102 defines a first end 104, an opposing second end 106, and opposing inner surface 108 and outer surface 110 aligned along a longitudinal axis A of cage 100.

As best seen in FIGS. 3-8, a plurality of inlets 130 are formed in inner surface 108 of wall 102. Each inlet 130 defines a centerline 132 and inlets 130 are spaced such that centerlines 132 of inlets 130 have a first regular spacing 134. Similarly, a plurality of outlets 120 are formed in outer surface 110 of wall 102. Each outlet 120 also defines a centerline 122 and outlets 120 are spaced such that centerlines 122 of outlets 120 have a second regular spacing 124. Second regular spacing 124 is different than first regular spacing 134 and, in the example shown, second regular spacing 124 is greater than first regular spacing 134. However, in a cage used with a control valve having a flow down orientation, the inlets would be formed on the outer surface, the outlets would be formed on the inner surface, and the spacing of the inlets on the outer surface would be smaller than the spacing of the outlets on the inner surface.

Figure 6:
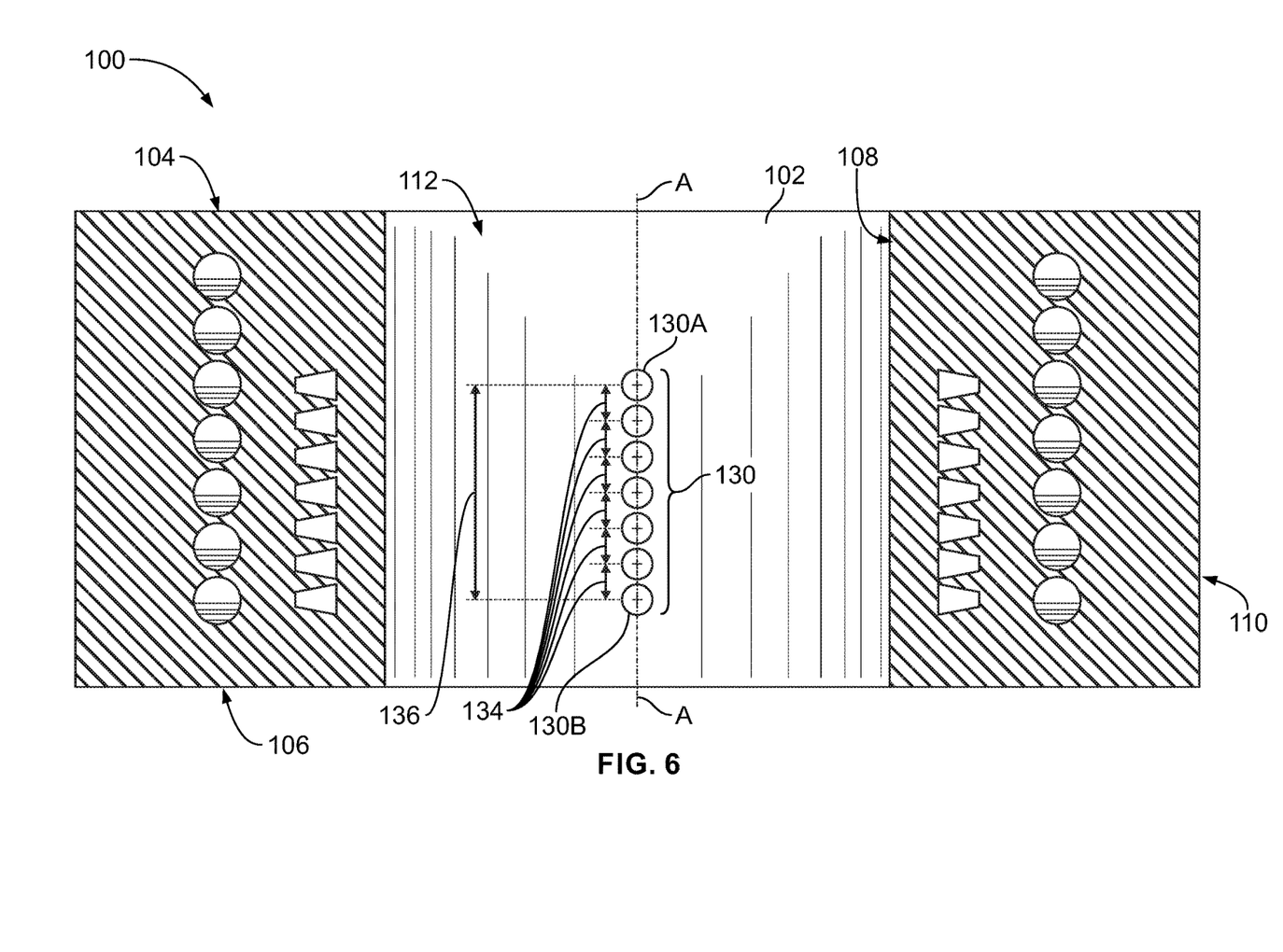
FIG. 6 is a side cross-sectional view of the control valve cage of FIG. 2 taken along the line 6-6 of FIG. 3.

As shown in FIG. 6, a longitudinal distance along inner surface 108 between a first inlet 130A, closest to first end 104 of cage 100, and a second inlet 130B, closest to second end 106 of cage 100, defines an inner flow length 136 of inner surface 108. Similarly, as shown in FIG. 3, a longitudinal distance along outer surface 110 between a first outlet 120A, closest to first end 104 of cage 100, and a second outlet 120B, closest to second end 106 of cage 100, defines an outer flow length 126 of outer surface 110. In the example shown, inner flow length 136 is less than outer flow length 126. However, in a cage used with a control valve having a flow down orientation, the inlets would be formed on the outer surface, the outlets would be formed on the inner surface, and the inner flow length would be greater than the outer flow length.

Figure 7:
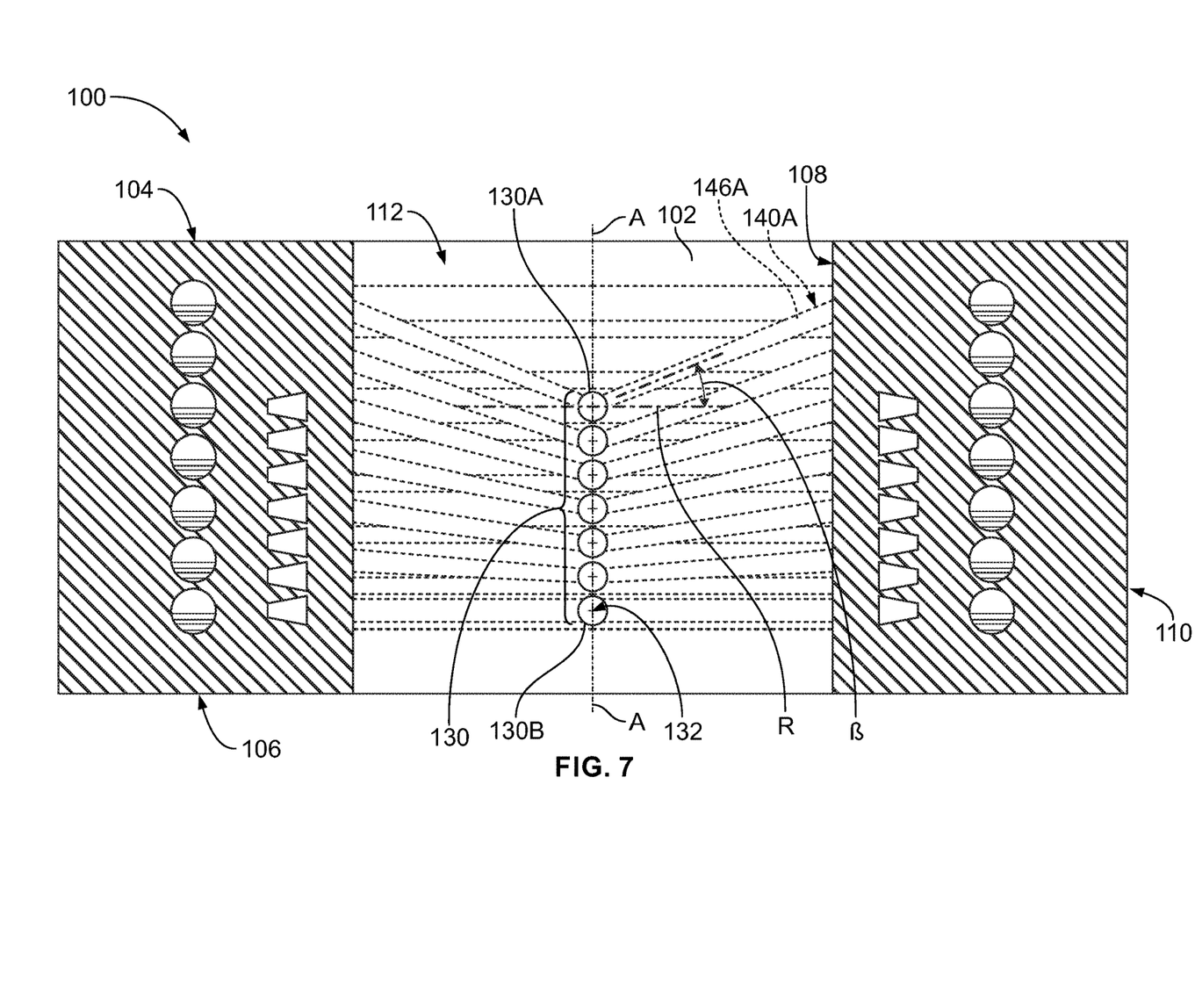
FIG. 7 is the side cross-sectional view of the control valve cage of FIG. 6 with flow passages shown in phantom.
Figure 8:
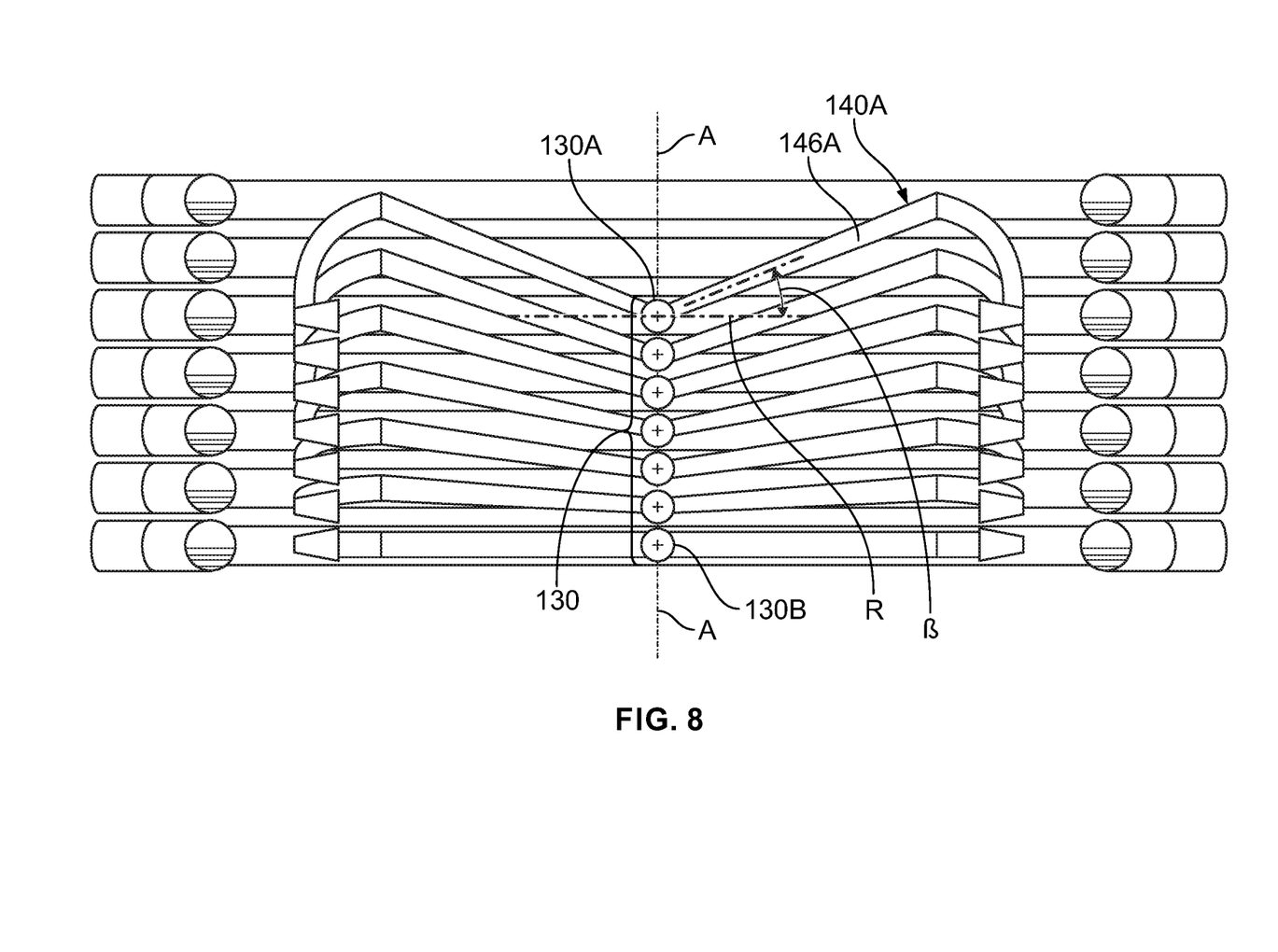
FIG. 8 is an illustration of the flow passages of the control valve cage of FIG. 6.
Figure 9:
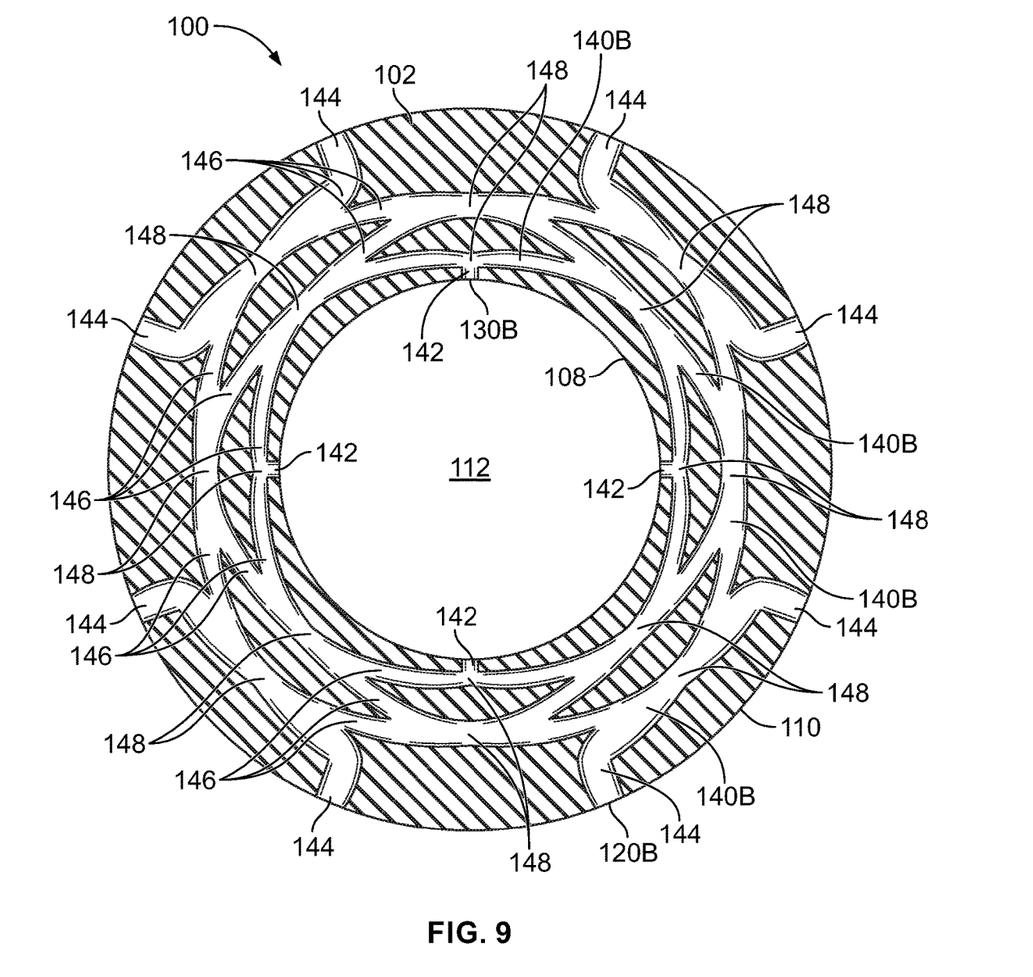
FIG. 9 is a top cross-sectional view of the control valve cage of FIG. 2 taken along the line 9-9 in FIG. 2.

Outlets 120 are in fluid communication with inlets 130 through a plurality of flow passages 140 formed through wall 102, which each have a generally spiral shape about longitudinal axis A. For example, as best seen in FIGS. 4-5 and 7-8, first outlet 120A is in fluid communication with first inlet 130A through generally spiral shaped flow passage 140A. Similarly, as best seen in FIG. 9, second outlet 120B is in fluid communication with second inlet 130B through generally spiral shaped second flow passage 140B.

Each flow passage 140 is shaped to increase the amount of drag exerted on the fluid. The generally spiral shape of flow passages 140 maximizes the length of the flow path as they travel from inlets 130 to outlets 120. In some instances, the cross-sectional area of the flow passages 140 may be selected to ensure that the fluid quickly attaches to the inner and outer walls and gradually expand to control the velocity of the fluid as the pressure is reduced. Flow passages 140 can also be shaped to reduce noise and cavitation, for example, by avoiding closely spaced or consecutive abrupt changes in direction, defined herein as an included angle of ninety degrees or less between adjacent flow passage portions.

Flow passages 140 can have a generally circular cross-sectional shape or can have other non-circular cross-sectional shapes, such as square, rectangle, triangle, oval, star, polygon, tear-drop, and irregular shapes. In addition, the cross-sectional area of flow passages 140 can vary from inner surface 108 to outer surface 110. For example, flow passages 140 can have a decreasing cross-sectional area from inner surface 108 to outer surface 110, an increasing cross-section area from inner surface 108 to outer surface 110, a cross-sectional area that fluctuates between increased and decreases size, or a cross-sectional area that changes shape as it passes from inner surface 108 to outer surface 110.

In example shown, each flow passage 140 has an inlet section 142 that extends generally radially in relation to longitudinal axis A from inner surface 108, an outlet section 144 that extends generally radially in relation to longitudinal axis A from outer surface 110, and an arcuate intermediate section 146 that extends between inlet section 142 and outlet section 144 and has the generally spiral shape about longitudinal axis A. As best seen in FIGS. 7 and 8, a portion of intermediate sections 146 extend at an acute angles from radial planes extending generally perpendicular to longitudinal axis A and through corresponding inlet sections 142. For example, first flow passage 140A has an intermediate section 146A that extends at an acute angle $\beta$ from a radial plane R extending generally perpendicular to longitudinal axis A and through first inlet 130A. As seen in FIG. 8, the acute angle of adjacent intermediate sections 146 increases from second end 106 of cage 100 to first end 104 of cage 100, which provides the compact spacing of inlets 130 and the greater spacing of outlets 120.

Each inlet section 142 can be common to multiple intermediate sections 146 of flow passages 140 and can provide fluid entry for multiple flow passages 140. For example, inlet section 142A of flow passage 140A can be common to intermediate sections 146A, 146B and provide fluid entry for intermediate sections 146A, 146B. Because of the relatively abrupt direction change between inlet sections 142 and intermediate sections 146, recovery zones 150 can be provided in each intermediate section 146, immediately downstream of inlet section 142.

Intermediate sections, for example intermediate sections 146A, 146B, that are in fluid communication with a common inlet section, for example inlet section 142A, can spiral in generally opposite directions such that flow passages 140 can cross at least one other flow passage 140 at an intersection 148 so that the collision of the fluid in flow passages 140 dissipates the energy in the fluid and reduces the fluid pressure. As each intermediate section 146 extends from inlet section 142 to outlet section 144, it can intersect with other intermediate sections 146. Each intermediate section 146 can also include a recovery zone 152 downstream of the intersections 148.

Using cage 100, actuator 30 can be sized to stroke valve plug 26 along longitudinal axis A throughout inner flow length 136 of inner surface 108 to modulate a fluid flow along outer flow length 126 of outer surface 110.

While various embodiments have been described above, this disclosure is not intended to be limited thereto. Variations can be made to the disclosed embodiments that are still within the scope of the appended claims.

What is claimed:

1. A control valve, comprising:
   a body having an inlet and an outlet;
   a valve seat positioned in a passageway of the body between the inlet and the outlet;
   a valve plug positioned within the body and movable between an opened position and a closed position to modulate a fluid flow at the outlet; and
   a cage disposed within the body adjacent the valve seat and proximate the valve plug, the cage comprising:

a circumferential wall having an outer surface and an inner surface aligned along a longitudinal axis of the cage, a first end, and a second end opposite the first end; wherein the outer surface defines an outer flow length, the outer flow length defined by a longitudinal distance between a centerline of a first outlet formed in the outer surface, closest to the first end of the cage, and a centerline of a second outlet formed in the outer surface, closest to the second end of the cage; and the inner surface defines an inner flow length that is less than the outer flow length, the inner flow length defined by a longitudinal distance between a centerline of a first inlet formed in the inner surface, closest to the first end of the cage, and a second inlet formed in the inner surface, closest to the second end of the cage.

2. The control valve of claim 1, wherein the first outlet is in fluid communication with the first inlet through a first flow passage and the second outlet is in fluid communication with the second inlet through a second flow passage.

3. The control valve of claim 2, wherein the first flow passage and the second flow passage have a generally spiral shape about the longitudinal axis.

4. The control valve of claim 2, wherein the first flow passage has a portion that extends at an acute angle from a radial plane extending generally perpendicular to the longitudinal axis and through the first inlet.

5. The control valve of claim 1, wherein the cage is an integral, solid cylinder.

6. The control valve of claim 1, wherein the cage comprises a plurality of stacked disks.

7. The control valve of claim 1, wherein the control valve further comprises an actuator sized to stroke the valve plug along the longitudinal axis throughout the inner flow length of the inner surface to modulate a fluid flow along the outer flow length of the outer surface.

8. The control valve of claim 1, wherein:
a plurality of outlets are formed in the outer surface;
a plurality of inlets are formed in the inner surface;
each of the plurality of inlets defines a centerline;
each of the plurality of outlets defines a centerline;
a plurality of flow passages are formed through the wall and provide fluid communication between the inlets and the outlets;
the inlets are longitudinally spaced such that the centerlines of the inlets have a first regular spacing; and
the outlets are longitudinally spaced such that the centerlines of the outlets have a second regular spacing, different than the first regular spacing.

9. The control valve of claim 8, wherein the second regular spacing is greater than the first regular spacing.

10. The control valve of claim 8, wherein each flow passage comprises an inlet section that extends generally radially, an outlet section that extends generally radially, and an intermediate section extending between the inlet section and the outlet section and having a generally spiral shape.

11. The control valve of claim 10, wherein:
a common inlet section provides fluid entry for multiple flow passages;
the intermediate sections of the multiple flow passages spiral in generally opposite directions; and
each flow passage crosses at least one other flow passage at an intersection and each intermediate section includes a recovery zone downstream of the intersection.

12. A control valve cage, comprising:
a circumferential wall having an outer surface and an inner surface aligned along a longitudinal axis of the control valve cage;
a plurality of inlets formed in the inner surface, each of the inlets defining a centerline;
a plurality of outlets formed in the outer surface, each of the outlets defining a centerline; and
a plurality of flow passages formed through the wall and providing fluid communication between the inlets and the outlets, each flow passage comprising an inlet section, an outlet section, and an intermediate section extending between the inlet section and the outlet section and having a generally spiral shape about the longitudinal axis; wherein
the cage is an integral, solid cylinder; and
at least a portion of the intermediate sections extend at an acute angle from radial planes extending generally perpendicular to the longitudinal axis and through a corresponding inlet section.

13. The control valve cage of claim 12, wherein:
a common inlet section provides fluid entry for multiple flow passages;
the intermediate sections of the multiple flow passages spiral in generally opposite directions; and
each flow passage crosses at least one other flow passage at an intersection and each intermediate section includes a recovery zone downstream of the intersection.

14. The control valve cage of claim 12, wherein the outer surface defines an outer flow length and the inner surface defines an inner flow length that is less than the outer flow length.

15. The control valve cage of claim 14, wherein the control valve cage further comprises:
a first end; and
a second end opposite the first end; wherein
a longitudinal distance between a first outlet, closest to the first end of the cage, and a second outlet, closest to the second end of the cage, defines the outer flow length; and
a longitudinal distance between a first inlet, closest to the first end of the cage, and a second inlet, closest to the second end of the cage, defines the inner flow length.

16. A control valve including the control valve cage of claim 14, the control valve comprising:
a body having an inlet and an outlet;
a valve seat positioned in a passageway of the body between the inlet and the outlet; and
a valve plug positioned within the body and movable between an opened position and a closed position to modulate a fluid flow at the outlet; wherein
the control valve cage is disposed within the body adjacent the valve seat and proximate the valve plug.

17. The control valve of claim 16, wherein the control valve further comprises an actuator sized to stroke the valve plug along the longitudinal axis throughout the inner flow length of the inner surface to modulate a fluid flow along the outer flow length of the outer surface.

* * * * *

UNITED STATES PATENT AND TRADEMARK OFFICE
CERTIFICATE OF CORRECTION

PATENT NO. : 10,458,555 B2  
APPLICATION NO. : 15/491341  
DATED : October 29, 2019  
INVENTOR(S) : McCarty Page 1 of 1

It is certified that error appears in the above-identified patent and that said Letters Patent is hereby corrected as shown below:

In the Specification

At Column 6, Line 17, "an acute angles" should be --acute angles--.

Signed and Sealed this  
Eighth Day of February, 2022

Drew Hirshfeld  
*Performing the Functions and Duties of the*  
*Under Secretary of Commerce for Intellectual Property and*  
*Director of the United States Patent and Trademark Office*